(12) United States Patent
Chilcote

(10) Patent No.: US 7,316,062 B2
(45) Date of Patent: Jan. 8, 2008

(54) SOLDER EXTRACTION TOOL AND METHOD

(75) Inventor: James L. Chilcote, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 355 days.

(21) Appl. No.: 10/856,528

(22) Filed: May 27, 2004

(65) Prior Publication Data

US 2005/0262687 A1 Dec. 1, 2005

(51) Int. Cl.
*H01R 9/00* (2006.01)

(52) U.S. Cl. .......................... 29/843; 29/840; 29/842; 29/874; 228/180.21; 439/83

(58) Field of Classification Search ................ 29/825, 29/840, 842–843, 874, 884; 228/180.21, 228/180.22; 427/591, 593, 123; 219/228, 219/230; 439/578, 271
See application file for complete search history.

(56) References Cited

U.S. PATENT DOCUMENTS

| | | | |
|---|---|---|---|
| 3,648,357 A | | 3/1972 | Green |
| 3,750,265 A | * | 8/1973 | Cushman ............... 228/180.21 |
| 3,842,240 A | * | 10/1974 | Wakita et al. ............ 219/230 |
| 4,087,907 A | * | 5/1978 | Taylor .......................... 29/721 |
| 4,619,841 A | | 10/1986 | Schwerin |
| 4,804,129 A | | 2/1989 | Brown et al. |
| 5,375,757 A | * | 12/1994 | Covill .......................... 228/46 |
| 5,609,490 A | * | 3/1997 | Beesch et al. ............... 439/79 |
| 5,893,992 A | * | 4/1999 | Kilmer ...................... 228/20.5 |
| 6,659,335 B2 | * | 12/2003 | Nagata ....................... 228/256 |
| 2004/0011850 A1 | | 1/2004 | Bayot et al. |
| 2005/0262687 A1 | * | 12/2005 | Chilcote ..................... 29/729 |

FOREIGN PATENT DOCUMENTS

| | | |
|---|---|---|
| DE | 19954987 A1 | 6/2001 |
| GB | 1182848 A | 3/1970 |

OTHER PUBLICATIONS

PCT International Search Report: PCT/US2005/018358, Sep. 27, 2005, EP International Search Authority, 7 pages.

* cited by examiner

*Primary Examiner*—Minh Trinh
(74) *Attorney, Agent, or Firm*—McDonnell Boehnen Hulbert & Berghoff LLP

(57) ABSTRACT

Methods and apparatus are provided for removing plating from a device. The method and apparatus may be used for preparing an electrical connector for connecting at least one wire or other terminus thereto where the electrical connector has at least one electrical contact with a metal coating thereon. The method includes the steps of applying molten solder to the electrical contact whereby the coating dissolves into the molten solder to thereby create a molten coating-solder mixture and rotating the electrical connector whereby the molten coating-solder mixture is removed from the electrical contact.

10 Claims, 4 Drawing Sheets

SOLDER EXTRACTION TOOL AND METHOD

FIELD OF THE INVENTION

The present invention relates to electrical connectors and, more specifically, to a tool and method for extracting solder from the solder cups of the electrical connectors.

BACKGROUND OF THE INVENTION

Electrical connectors are used in myriad applications for joining wires and electrical components to one another. Typically, an electrical connector includes a housing and a plurality of electrical contact pins that extend through the housing. In some configurations, the electrical contact pin includes a contact end and a wire input end. The wire input end is typically shaped like a cup and when the electrical connector is joined to a wire, the wire is placed in the cup and molten solder is utilized to join the two together. Hence, the wire input end is referred to in the art as a "solder cup".

In order to prevent oxidation and wear of the contact pins and the solder cups, an oxidation-resistant material, such as gold, may be plated on to both. However, when the molten solder is applied to the solder cups during a soldering process, the plated gold melts and dissolves into the solder. The gold contaminates the solder, thereby compromising the strength of the soldered joint between the wire and the contact pin. Therefore, as part of the wire joining process, the gold plating is desirably removed from the solder cup.

Conventionally, the gold plating has been removed by first pre-tinning the solder cup and then manually extracting the excess solder from each individual solder cup. Typically, a technician first applies molten solder to each of the solder cups. Next, the technician uses a soldering iron to apply heat to one of the soldered solder cups to melt the solder within the solder cup. The melted solder causes the gold plating to melt and dissolve into the solder. A solder wick is then used to draw the molten solder and gold out of the cup.

Although the conventional method is effective, it may be time-consuming, and thus potentially costly. For example, manual extraction of the gold plating from one solder cup may take up to a minute. If an electrical connector has over one hundred electrical contacts, a technician may spend over an hour and a half on the extraction step alone.

Hence, there is a need for a method of soldering a wire to a wire connector that addresses one or more of the above-noted drawbacks. Namely, a soldering method is needed that is more time-efficient and simple to implement, and thus less costly than present methods. The present invention addresses one or more of these needs.

BRIEF SUMMARY OF THE INVENTION

A method is provided for preparing an electrical connector for connecting at least one wire thereto, where the electrical connector having at least one electrical contact with a coating thereon. The method includes the steps of applying molten solder to the electrical contact whereby the coating dissolves into the molten solder to thereby create a molten coating-solder mixture and rotating the electrical connector whereby the molten coating-solder mixture is removed from the electrical contact.

In another embodiment of the invention, an apparatus for use in removing a coating from a coated electrical contact of an electrical connector is also provided. The apparatus includes a shaft, a plate assembly, and a motor. The plate assembly is coupled to the shaft, and has a first side and a second side and an aperture extending at least partially there between. The aperture is configured to receive the electrical contact of the electrical connector. The motor is coupled to the shaft and configured to supply rotational energy to thereby rotate the shaft and the plate assembly.

In yet another embodiment of the invention, an apparatus for use with a rotatable shaft in removing a coating from a coated electrical contact of an electrical connector is provided. The apparatus includes a plate assembly, an aperture, and at least one fastener opening. The plate assembly has first and second sides and is configured to couple to the rotatable shaft. The aperture is formed between the plate first and second sides, and is configured to receive the contact end of the electrical contact. The at least one fastener opening is configured to receive a fastener for fastening the electrical connector to the plate assembly.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. Although the invention is described as being used for extracting solder from solder cups on an electrical connector, it will be appreciated that the invention may also be used with any other type of component having plating or a soluble contaminate thereon that may need to be removed.

Figure 1:
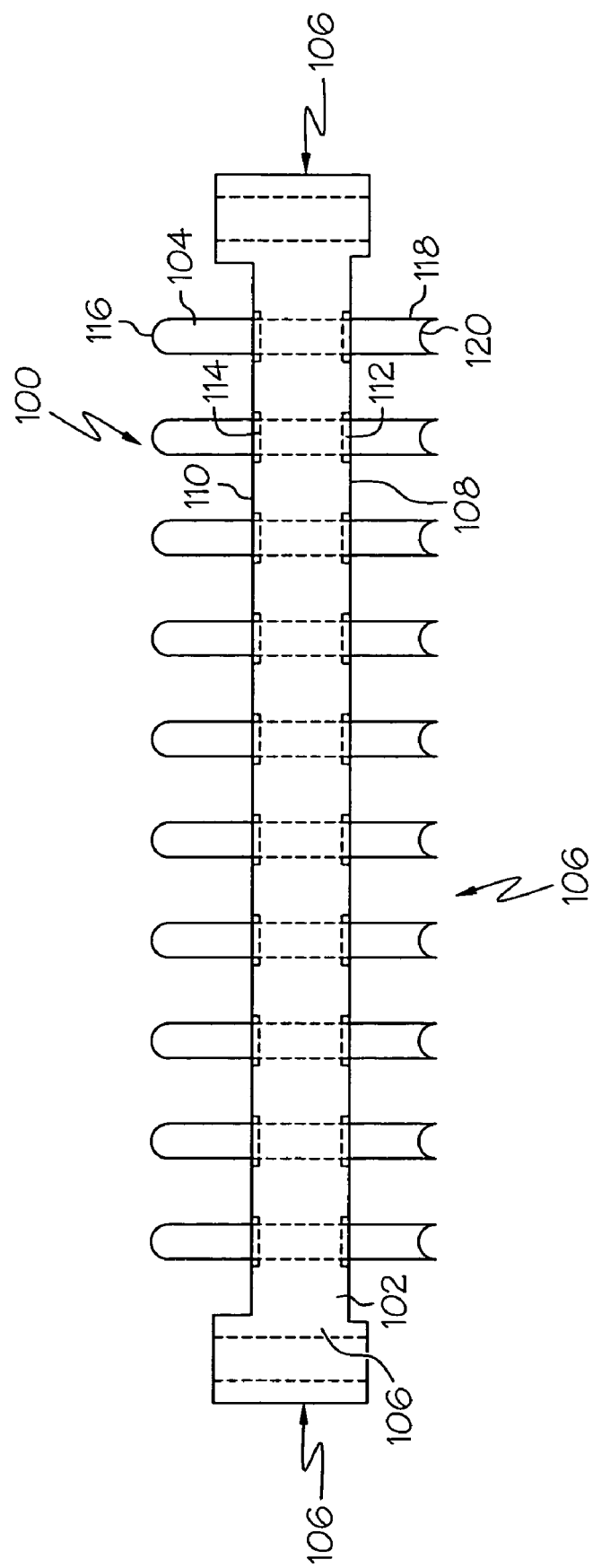
FIG. 1 is a perspective view of an electrical connector.

Turning now to FIG. 1, an exemplary electrical connector 100 is shown. The electrical connector 100 includes a housing 102 and a plurality of electrical contacts 104. The housing 102 has a plurality of sidewalls 106 and top and bottom walls 108 and 110, respectively. The top wall 108 is coupled to the sidewalls 106 such that it forms a well 111 with the sidewalls 106. Additionally, a plurality of apertures 112, 114 are formed in the top and bottom walls 108, 110. Each aperture 112 formed in the top wall 108 is aligned with a corresponding aperture 114 on the bottom wall 110. The apertures 112, 114 are each configured to receive one of the plurality of electrical contacts 104.

Each electrical contact 104 is generally tubular and is constructed of an electrically conductive material. The electrical contact 104 has a contact end 116 and a wire joint end 118. The electrical contacts 104 are placed within the housing 102 such that the contact end 116 extends out from the top wall 110 of the housing 102, while the wire joint end 118 extends out from the bottom wall 108 of the housing 102. The wire joint end 118 includes a cup 120 that is configured to receive a wire end or other terminus within its interior. Each electrical contact 104, hence, the cup 120, is plated with an oxidation-resistant metal, such as, for example, gold.

Figure 2:
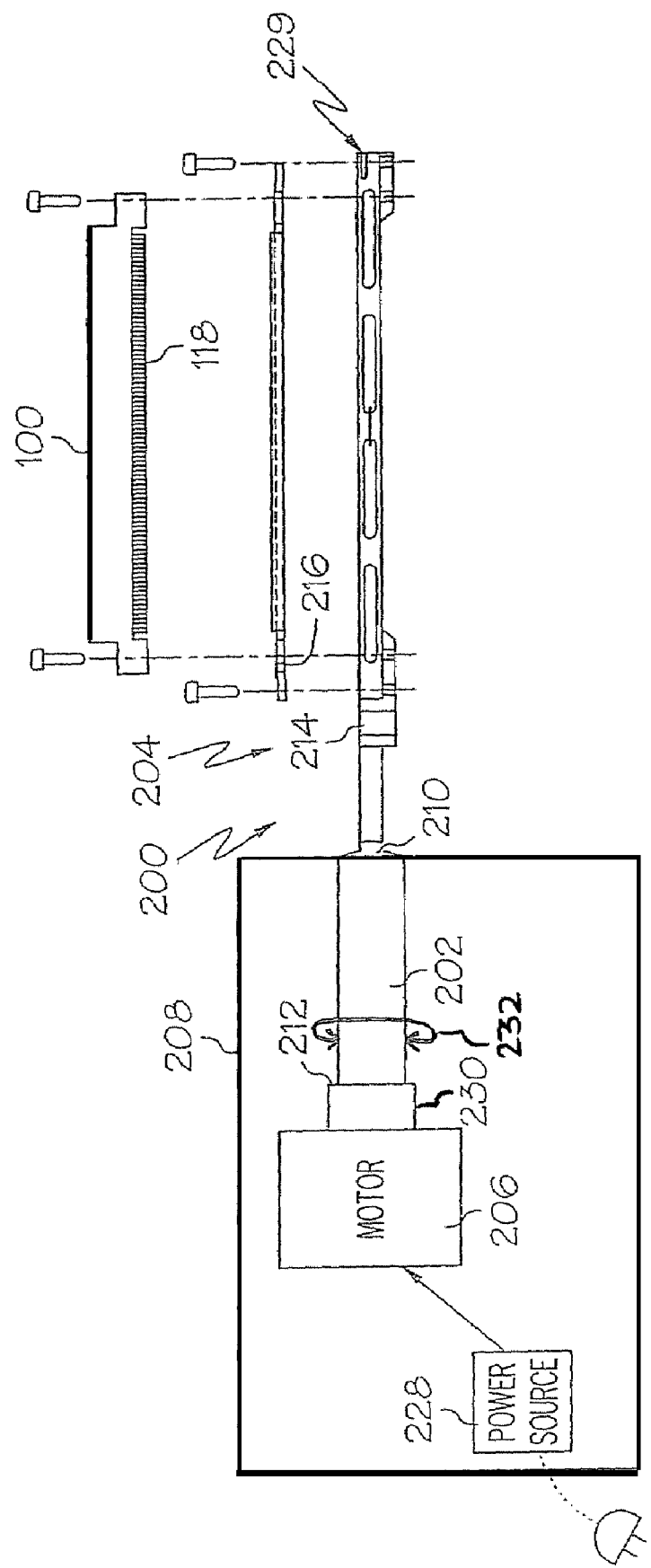
FIG. 2 is an exploded side view of an exemplary tool with the electrical connector illustrated in FIG. 1 that may be used for an exemplary embodiment of the method.

Before a wire is joined to each electrical contact 104, the plated metal is preferably removed from the contact 104. Referring now to FIG. 2, an exploded view of a tool 200 that may be used to remove the plated metal is illustrated. For context, an electrical connector 100 is also in FIG. 2. In general, the tool 200 includes a shaft 202, a plate assembly 204, a motor 206, and a housing 208. In the depicted embodiment, the shaft 202 is generally cylindrical and has a first end 210 and a second end 212. The shaft first end 210 is configured to couple to the plate assembly 204, and the shaft second end 212 is coupled to the motor 206.

Figure 3:
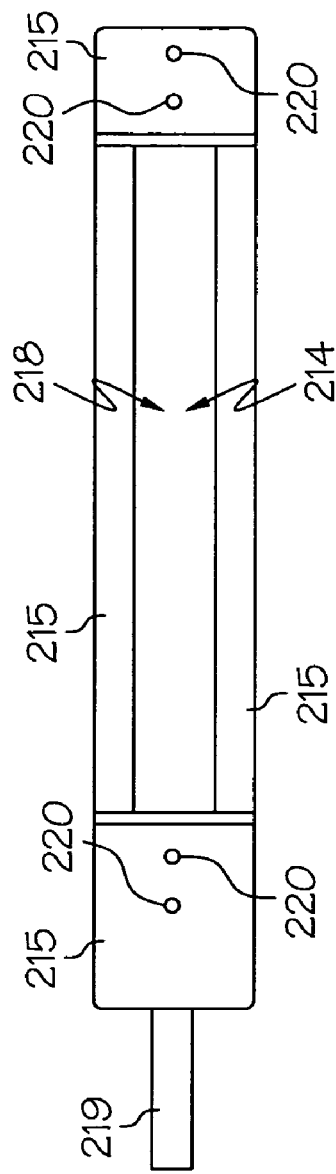
FIG. 3 is a top view of an exemplary cradle that may be used with the exemplary tool illustrated in FIG. 2.

The plate assembly 204 is generally configured to allow the electrical connector 100 to temporarily mount thereto. Any one of numerous configurations may be employed in this regard. In one exemplary embodiment, such as the one illustrated in FIG. 2, the plate assembly 204 includes a cradle 214 and an insert 216. As illustrated in further detail in FIG. 3, the cradle 214 has four walls 215 arranged in a generally rectangular configuration to form a slot 218 therebetween. An appendage 219 extends perpendicularly from one of the walls 215, and is configured to couple to the shaft first end 210. The cradle 214 also has a plurality of fastener openings 220 that are each configured to receive a fastener.

Figure 4:
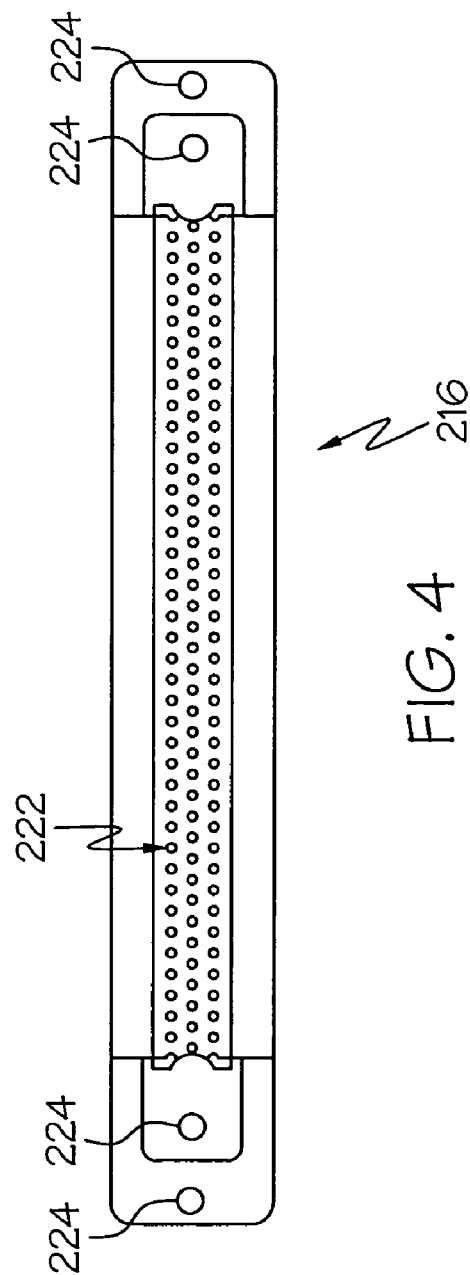
FIG. 4 is a top view of an exemplary insert that may be used with the exemplary tool illustrated in FIG. 2 and the exemplary cradle illustrated in FIG. 3.

As shown in FIG. 4, the insert 216 is generally rectangular in shape and includes a plurality of cavities 222 that extend at least partially through the insert 216. The cavities 222 are preferably arranged in substantially the same pattern in which the electrical contacts 104 are arranged on the particular electrical connector 100 being processed. In addition, each cavity 222 is sized and shaped to receive the wire joint ends 118 of the electrical contacts 104. Thus, when the electrical connector 100 is attached to the tool 200, the wire joint ends 118 of the electrical contacts 104 will be positioned radially outward from the shaft 202. As FIG. 4 also shows, the insert 216 also preferably includes at least one fastener opening 224. Each fastener opening 224 is collocated with one of the fastener openings 220 in the cradle 214 and is configured to receive a fastener for fastening the electrical connector 100 to the plate assembly 204 and the insert 216 to the cradle 214.

Although the plate assembly 204 is described above as having both the cradle 214 and the insert 216, it will be appreciated that in other exemplary embodiments of tool 200, the insert 216 may be coupled to the shaft 202 without the cradle 214 or the cradle 214 may be coupled to the shaft 202 without the insert 216. Additionally, although the plate assembly 204, cradle 214, and insert 216 are described herein as generally rectangular, it will be appreciated that any other suitable shape may be employed as well.

Returning to FIG. 2, the motor 206 has a rotor 230 coupled to the shaft second end 212. The motor 206 is also coupled to a power source 228. The power source 228 supplies energy to the motor 206 to spin the rotor 230, and thus, the shaft 202 and plate assembly 204. Any one of numerous devices configured to provide power may be utilized. In one exemplary embodiment, the power source 228 is a plug (shown in phantom) that is electrically coupled to a power outlet. In another exemplary embodiment, the tool 200 itself is mounted to a power outlet (not shown). In yet another exemplary embodiment, the power source 228 is a battery (not shown) configured to provide sufficient energy to the motor 206 to thereby spin the shaft 202 (as indicated by arrow 232 in FIG. 2) and plate assembly 204. In yet another exemplary embodiment, the power source 228 uses pneumatics, such as compressed gas, or hydraulics, such as pumped liquid, to energize the motor 206.

In another exemplary embodiment, the shaft 202 and motor 206 can be at least partially disposed within a housing 208. The housing 208 is preferably dimensioned to fit in a hand and/or provide a surface for the operator to grip the tool 200. In still yet another exemplary embodiment, the plate assembly 204 is configured to attach to and detach from a conventional rotary tool. The plate assembly 204 can be an accessory that is preferably configured to fit with any type of rotary tool, such as, for example, a drill. In yet other exemplary embodiments, the tool 200 may be incorporated into a robotic machine for use in an automated process.

In yet another exemplary embodiment of the tool 200, an indicator 229 may be included on the tool 200 that provides a mark to indicate an appropriate dipping depth. The indicator 229 may be any type of marking formed on the plate 204.

Figure 5:
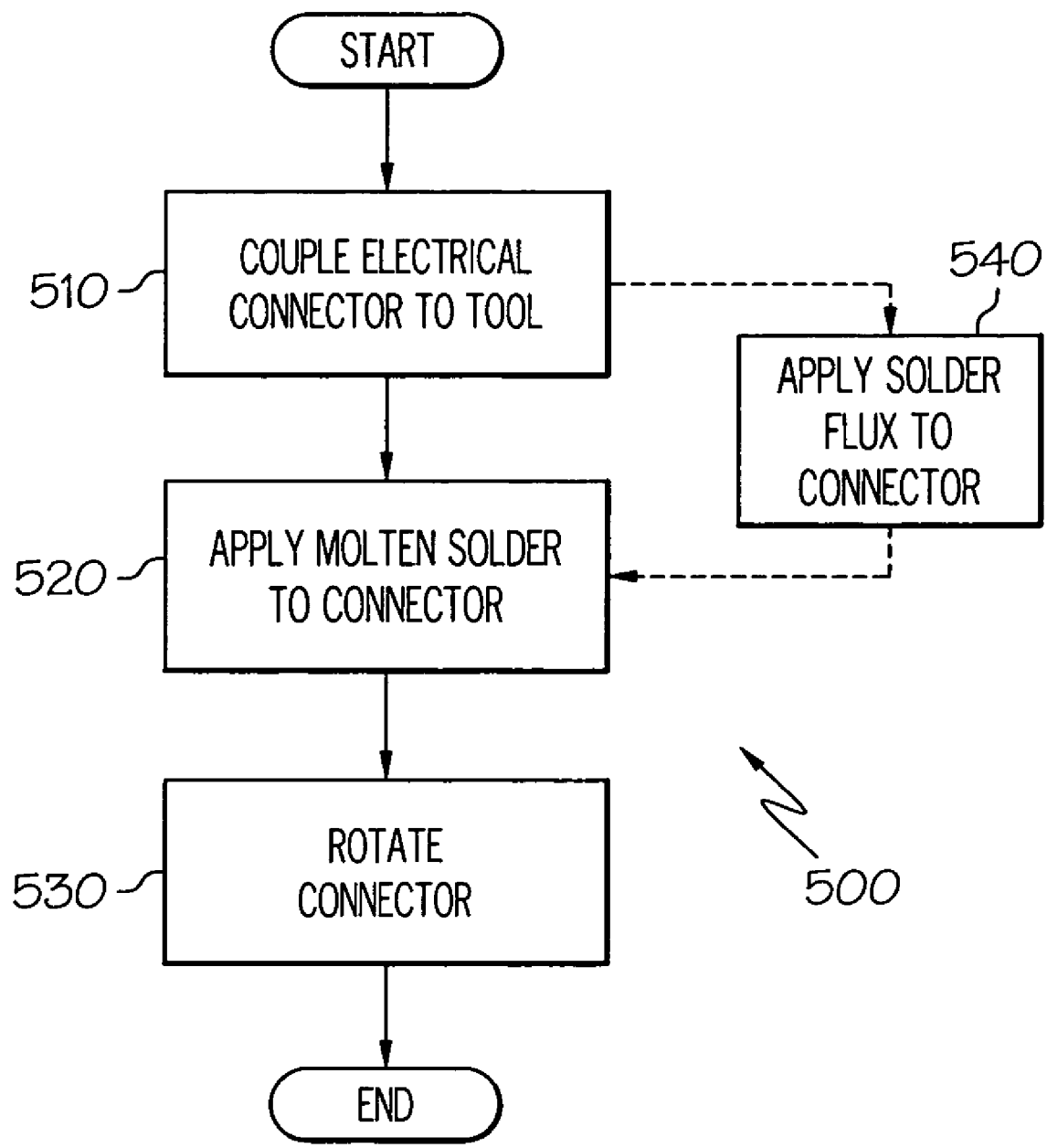
FIG. 5 is a flowchart illustrating an exemplary embodiment of the inventive method.

With reference to FIG. 5, an exemplary embodiment of the method (500) by which the plating metal is removed from a solder cup will now be described. First, the electrical connector 100 is coupled to the tool 200 (510). Then, molten solder is applied to the electrical connector 100 (520). Next, the electrical connector 100 is rotated (530). These steps will now be discussed in further detail.

The step of coupling the electrical connector 100 to the tool 200 (510) is achieved in any one of numerous fashions, depending upon the particular configuration of the tool 200. For example, if the exemplary tool 200 depicted in FIG. 2 is used, an operator first inserts the wire joint ends 118 of the electrical connector 100 into corresponding cavities 222. Then, the electrical connector 100 is fastened to the plate assembly 204 using any one of numerous types of fasteners, such as a screw, clip, spring clamp, or other mechanical mechanism, or alternatively, via magnetic or adhesive fasteners.

Returning to FIG. 5, once the electrical connector 100 is coupled to the tool 200, molten solder (520) is applied to one or more of the electrical contacts 104. The molten solder may be contained in any one of numerous types of containers that maintains the solder in its molten state. For example, any one of numerous conventional molten solder pot could be used. In one exemplary embodiment, the operator dips at least the electrical contacts 104 into the molten solder so that an appropriate amount of molten solder is applied thereto. In this regard, the operator may rely on the indicator 229 to determine how deep the tool 200 should be dipped into the molten solder. In yet another exemplary embodiment, the molten solder container is raised to contact the electrical contacts 104 within the molten solder. In yet another exemplary embodiment, solder is applied manually using a conventional solder gun or solder iron.

No matter the particular method that is used to apply solder to the electrical contacts 104, when this is done, the gold plating on the electrical contacts 104 melts and dissolves into the molten solder. To remove the solder/gold mixture from the electrical contacts 104, the electrical connector 100 is then spun about an axis (530). In one exemplary embodiment, the tool 200, or at least a portion thereof, is inserted into a protective container (not shown). The tool motor 206 is then energized causing it to rotate the plate assembly 204 and attached electrical connector 100. The centrifugal force generated by this spinning motion slings the solder/gold mixture off of the connector 100 and into the protective container. This step is preferably performed immediately after the molten solder is applied to the gold plating so that the solder/gold mixture is still molten and readily removable from the electrical connector 100. Alternatively, heat may be applied to the electrical contacts 104 using radiation, conduction, convection, or any other suitable means from any suitable heat source to maintain the solder in its molten state.

In another exemplary embodiment of the method, the electrical contacts 104 are cleaned before the molten solder is applied to the electrical connector 100 (540). In one exemplary embodiment, solder flux is applied to the electrical contact 104, via spraying, dipping or brushing the flux onto the wire contact ends 118 of the electrical contacts 104 using any suitable device to do so.

Thus, a simple, time-efficient method of removing plating from has been provided. The method may be used to remove plating from an electrical connector, and more particularly, from the solder cups of an electrical connector. Moreover, the method may be used to remove plating from any device needing plating removed therefrom. An apparatus for use in the removing plating that is simple to use is provided as well.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for preparing an electrical connector for connecting at least one wire thereto, the electrical connector having at least one electrical contact with a coating thereon, the method comprising:

coupling the electrical connector to a tool configured to selectively rotate the electrical connector;

applying molten solder to the electrical contact whereby the coating dissolves into the molten solder to thereby create a molten coating-solder mixture; and removing the molten coating-solder mixture from the electrical contact by rotating the electrical connector.

2. The method of claim 1 further comprising:

cleaning the electrical contact before the step of applying the molten solder.

3. The method of claim 2, wherein the step of cleaning comprises applying solder flux to the electrical contact.

4. The method of claim 1, wherein the electrical contact includes a solder cup formed thereon and the step of rotating further comprises slinging the molten solder out of the solder cup.

5. The method of claim 1, wherein the step of coupling the electrical connector to a tool configured to selectively rotate the electrical connector further comprises inserting the at least one electrical contact into a plate assembly aperture, wherein the tool includes a plate assembly that is coupled to a rotating shaft and wherein the plate assembly has an aperture formed thereon.

6. The method of claim 5, wherein inserting further comprises positioning a wire joint end of the electrical contact radially outward from the rotating shaft.

7. The method of claim 1, further comprising:

positioning the electrical connector behind a shield, while rotating the electrical connector.

8. The method of claim 7, wherein the shield is a cylindrical container having an opening at one end.

9. The method of claim 1, wherein rotating the electrical connector comprises spinning the electrical connector about an axis.

10. The method of claim 9, wherein spinning the electrical connector slings the molten-solder mixture off of the electrical connector.

* * * * *